(12) United States Patent
Doyle et al.

(10) Patent No.: US 6,901,484 B2
(45) Date of Patent: May 31, 2005

(54) STORAGE-ASSISTED QUALITY OF SERVICE (QOS)

(75) Inventors: Ronald P. Doyle, Raleigh, NC (US); David L. Kaminsky, Chapel Hill, NC (US); David M. Ogle, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 213 days.

(21) Appl. No.: 10/162,966

(22) Filed: Jun. 5, 2002

(65) Prior Publication Data
US 2003/0229760 A1 Dec. 11, 2003

(51) Int. Cl.[7] .............................................. G06F 12/00
(52) U.S. Cl. ...................................... 711/134; 711/133
(58) Field of Search ................................ 711/134, 135, 711/133; 370/351

(56) References Cited

U.S. PATENT DOCUMENTS 5,737,752 A * 4/1998 Hilditch ..................... 711/133
6,223,256 B1 * 4/2001 Gaither ...................... 711/134
6,272,598 B1 * 8/2001 Arlitt et al. ................. 711/133
6,778,525 B1 * 8/2004 Baum et al. ................ 370/351

OTHER PUBLICATIONS

High–Tech Dictionary Definition, http://www.computer-user.com/resources/dictionary/definition.html?lookup=8364.*

D. Stacks, *Demystifying Storage Networking, DAS, SAN, NAS, NAS Gateways, Fibre Channel, and iSCSI, IBM Storage Networking*, (Jun. 2001).

* cited by examiner

Primary Examiner—Mano Padmanabhan
Assistant Examiner—Thang Ho
(74) Attorney, Agent, or Firm—Jeanine Ray-Yarletts; Steven M. Greenberg; Christopher & Weisberg, P.A.

(57) ABSTRACT

Storage-Assisted QoS. To provide storage-assisted QoS, a discriminatory storage system able to enforce a service discrimination policy within the storage system can include re-writable media; a storage system controller; a cache; and, a QoS enforcement processor configured to selectively evict entries in the cache according QoS terms propagated into the storage system through the storage system controller.

15 Claims, 2 Drawing Sheets

STORAGE-ASSISTED QUALITY OF SERVICE (QOS)

BACKGROUND OF THE INVENTION

1. Statement of the Technical Field

The present invention relates to storage system caching and more particularly to the management of cached data in a storage system.

2. Description of the Related Art

The vast majority of network devices process device requests indiscriminately. That is, regardless of the identity of the requestor or the type of request, each device request can be processed with equal priority. Given the exponential increase in network traffic across the Internet, however, more recent network-oriented computing devices have begun to provide varying levels of computing services based upon what has been referred to as a "policy based service differentiation model".

In a policy based service differentiation model, the computing devices can offer many levels of service where different requests for different content or services which originate from different requesters receive different levels of treatment depending upon administratively defined policies. In that regard, a service level agreement (SLA) can specify a guaranteed level of responsiveness associated with particular content or services irrespective of any particular requester. By comparison, quality of service (QoS) terms specify a guaranteed level of responsiveness minimally owed to particular requestors.

The policy based service differentiation model is the logical result of several factors. Firstly, the number and variety of computing applications which generate requests across networks both private and public has increased dramatically in the last decade. Each of these applications, however, has different service requirements and differentiated business value. Secondly, technologies and protocols that enable the provision of different services having different levels of security and QoS have become widely available. Yet, access to these different specific services must be regulated because these specific services can consume important computing resources such as network bandwidth, memory and processing cycles. Finally, business objectives or organizational goals can be best served when discriminating between different requests rather than treating all requests for computer processing in a like manner.

As device requests flow through the network and ultimately, to a file system communicatively linked to a storage system, the storage system can provide the terminal point of data access. More particularly, in response to many data requests originating in a network, a file storage device such as re-writable media ultimately physically retrieves the requested data. Accordingly, data caching systems at all levels of the network replicate data that ultimately can be physically retrieved from file storage. Like other elements of the network, however, in high request volume circumstances, response times attributable to file storage access can add considerable costs to the overall response time, as compared to responses generated from cache retrievals.

SUMMARY OF THE INVENTION

The present invention overcomes the limitations of conventional, non-discriminatory storage systems and provides a novel and nonobvious discriminatory storage system and method for enforcing a service discrimination policy within a storage system. In particular, in accordance with the present invention, a discriminatory storage system can include re-writable storage; a storage system controller; a cache; and, a QoS enforcement processor configured to selectively evict entries in the cache according QoS terms propagated into the storage system through the storage system controller.

In that regard, a cache eviction method can be performed in the storage system. The cache eviction method can include categorizing entries in a cache according to common QoS metrics. Categorizations whose entries consume an excessive portion of the cache can be identified. For example, a weighted average of entries in the cache can be computed for each of the categorized entries. Subsequently, categorizations can be identified which have a weighted average which exceeds a corresponding preferred allocation. In any case, an entry can be evicted from among one of the identified categorizations. In particular, the evicting step can include evicting an entry from among one of the identified categorizations whose weighted average most exceeds the corresponding preferred allocation. Moreover, the entry can be evicted according to a cache replacement methodology selected from the group consisting of least recently used, first-in first-out, last-in first out, and least frequently used.

In a preferred aspect of the present invention, the computing step can be performed for each category. Mathematically, then, for each category from among "j" total categories, an average can be computed according to the equation: Requests(QoS Metric$_j$)/Requests(Total). Subsequently, each computed average can be weighted by QoS Metric$_j$. Importantly, to prevent disk thrashing which can result from those instances where the computed weighted average marginally exceeds the corresponding preferred allocation, a threshold hysterisis value can be established. Subsequently, only those categorizations which have a weighted average which exceed the corresponding preferred allocation by at least the threshold hysterisis value can be identified.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a system and method for enforcing QoS terms in a caching component of a storage system. In accordance with the present invention, QoS information specifying the QoS terms can be propagated from the data communications network to the storage system. In particular, the QoS information can be included as part of a request to retrieve data from the storage system. Upon receipt, the storage system both can retrieve the requested data and also the storage system can manage associated caching components using the QoS terms as a criteria for performing cache eviction. In this way, the caching components of the storage system can be optimized not absolutely, but according to the QoS terms.

Figure 1:
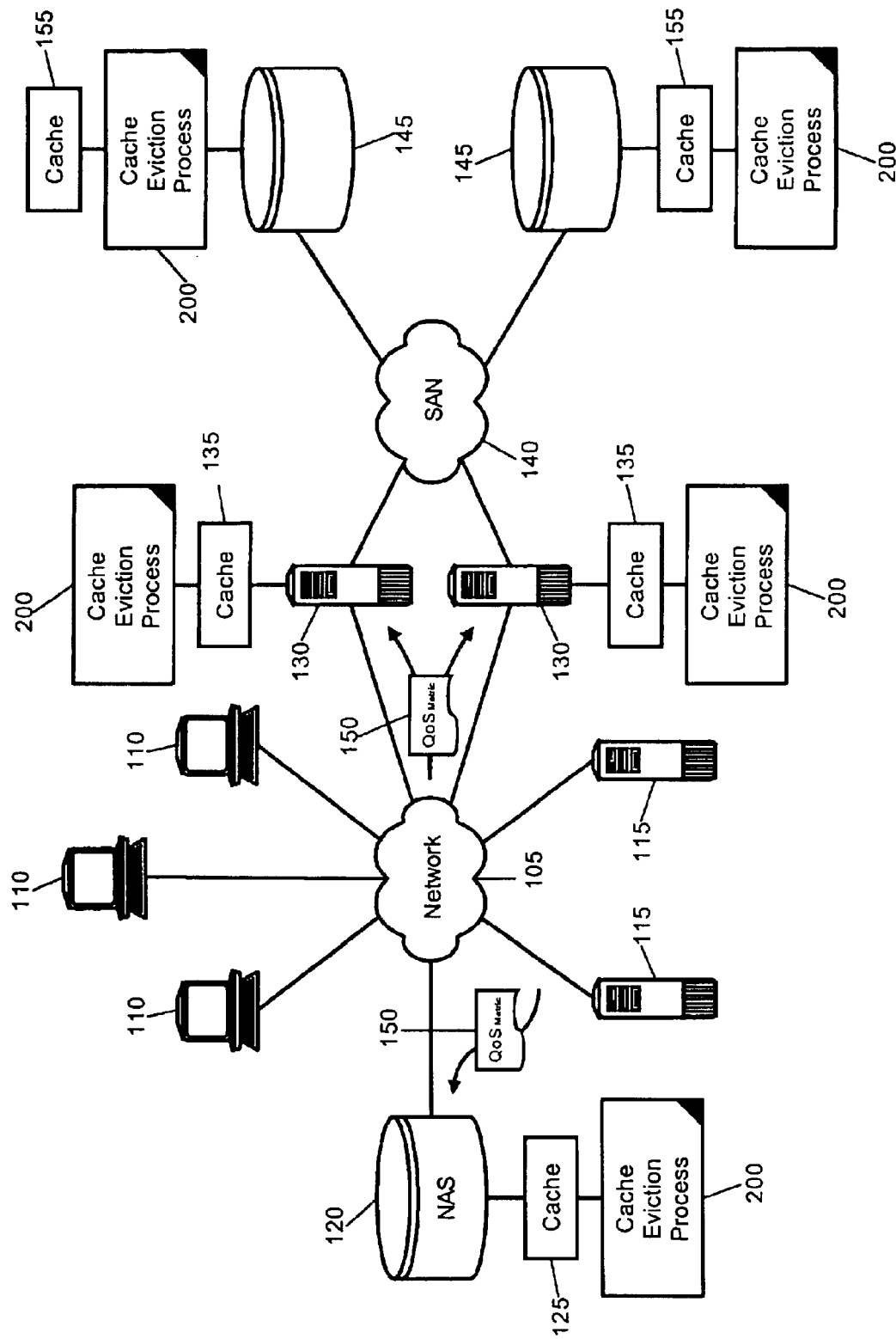
FIG. 1 is a schematic illustration of a data communications network employing both network attached storage (NAS) and a storage area network (SAN) to which QoS data can be propagated in order to enforce QoS terms in the NAS and SAN; and, FIG. 2 is a flow chart illustrating a process for enforcing QoS terms in a caching component of a storage system, such as the NAS and SAN of FIG. 1.

Though the cache eviction policies of the present invention can be applied to the caching components of any particular storage system, including direct attached storage (DAS), in accordance with the present invention, the QoS oriented caching policies can be applied to the caching components of a NAS or a SAN. In that regard, FIG. 1 is a schematic illustration of an exemplary data communications network employing both a NAS and a SAN to which QoS data can be propagated in order to enforce QoS terms in the NAS and SAN. The data communications network 105 can include both a multitude of client computing devices 110 communicatively linked to server computing devices 115.

In operation, client 110 requests for data can be forwarded to the servers 115. The servers 115 can respond to individual requests from the clients 110 in part by retrieving the requested data from a storage system. In the exemplary configuration, the storage system can include a SAN 150 having associated therewith one or more controlling SAN servers 130 and associated storage devices 145, each server 130 and storage device 145 potentially having a corresponding cache 135, 155. According to the exemplary configuration, the storage system alternatively can include a NAS 120 having a corresponding cache 125. Of course, as one skilled in the art will recognize, the invention is not limited to any particular arrangement of NAS and SAN components. In fact, DAS can be provided in lieu of or in combination with the NAS 120 and SAN 140 systems of FIG. 1. Thus, any arrangement of storage systems can suffice so long as the requested content can be retrieved from at least one storage system.

Data can be stored in the storage system, whether the storage system includes a DAS, NAS, or SAN architecture, according to the identity of the provider of the data. More particularly, in accordance with the inventive arrangements, QoS terms, which differentiate among different requestors of data or different types of data requested, can provide guidelines for caching data in the storage systems, for instance the NAS 120 or the SAN 140. To facilitate the identification of the requestor or the type of data requested, an associated QoS metric 150 can be included with request for data.

Responsive to receiving requests to retrieve data from storage, controlling components in each storage system 120, 140, such as a storage system processor or RAID controller, can cause the retrieval of the requested data from their respective caches 125, 135, 155 where available. When the requested data cannot be located in a corresponding cache 125, 135, 155, the controlling component can retrieve the requested data directly from re-writable media. In that case, once retrieved the data can be stored in the cache 125, 135, 155 as a new cache entry.

Importantly, though illustrated in a simplified manner in FIG. 1, the skilled artisan will recognize that caching components 125, 135 and 155 need not be directly linked to any one particular storage component in the storage system 120, 140. Rather, it will be understood that storage systems such as the NAS 120 and the SAN 140 can include a multitude of nested or parallel storage components and corresponding caching components. In consequence, it is expected that the QoS metrics can be propagated throughout the storage systems 120, 140 to the extent necessary to enforce the QoS terms within corresponding caching components as desired by the configurator of the respective storage systems 120, 140.

Returning now to FIG. 1, as is well known in the art, where a cache has been completely, or nearly completely populated with data, stale cache entries ordinarily are removed according to the proven cache eviction techniques in an effort to make room for new cache entries. Conventional cache eviction techniques include least recently used (LRU), first-in first-out (FIFO), last-in first-out (LIFO), and the like. In the present invention, however, cache entries are removed according to a modified cache eviction process 200 which removes cache entries not only according to conventional cache eviction rules, but also in consideration of the priority of the cached data in relation to the QoS terms associated with the cached data.

Figure 2:
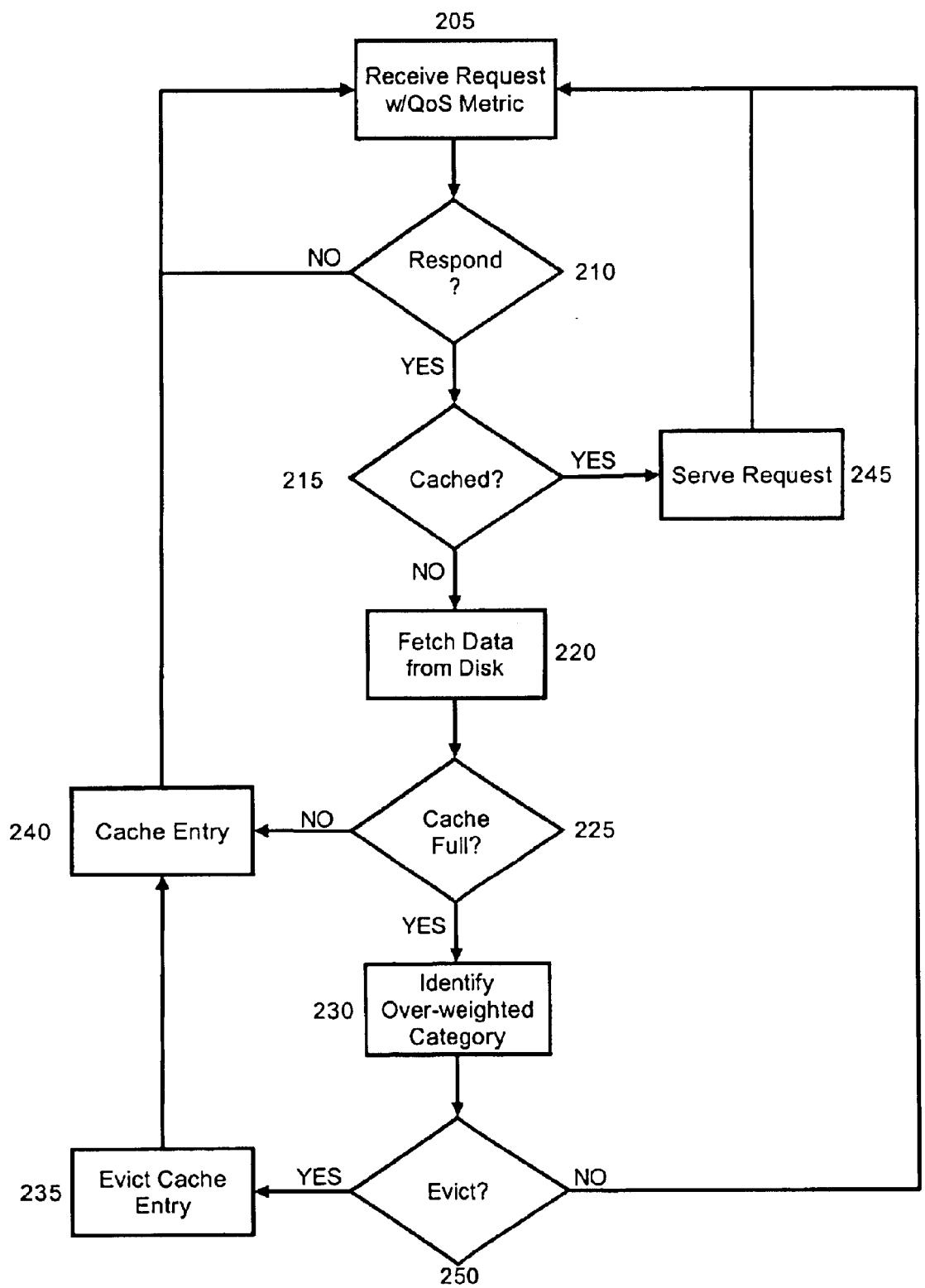

FIG. 2 is a flow chart illustrating a process for enforcing QoS terms during a cache eviction process in a caching component of a storage system, such as the NAS and SAN of FIG. 1. Beginning in block 205, a request can be received in the storage system to retrieve data stored therein. In this regard, the request can be received either in a storage controller directly associated with the storage media as would be the case with a NAS or DAS, or in a storage controller remotely associated with the storage media, as would be the case with a SAN. Of course, in each case of the DAS, NAS and SAN, multiple storage controllers can provide caching and, in consequence, the request can be propagated to selected storage components in the DAS, NAS and SAN.

Notably, the request can include a QoS metric identifying the requestor of the data and/or types of data requested for retrieval or the priority of the requestor of the data and/or types of data requested for retrieval. For example, the QoS metric can include an integer number within the range of one and ten indicating that data having a QoS metric of ten will receive ten times better service in the storage component than data having a QoS metric of one. Of course, it will be understood that the invention is not strictly limited to the nature of the QoS metric so long as the QoS metric indicates a relative priority of the requestor of the data or the type of data requested either through an identification of the requestor or the type of data requested, an association between the QoS metric and a level of service, or a direct indication of the level of service to be provided to the requester or the type of data requested.

To ensure backwards compatibility with storage systems which do not support the cache eviction policy of the present invention, optionally in decision block 210 the storage system component can ignore the QoS metric. Otherwise, in decision block 215 in can be determined whether the requested data has been previously cached. If so, in block 245 the data can be served from the cache and no further action will be required. If, in decision block 215, however, the requested data cannot be located in cache memory, the data can be retrieved and served from fixed storage in block 220.

Importantly, as in block 220 the requested data will not have been located in cache memory, the retrieved data can be stored in cache memory in block 240 if, in decision block 225, it is determined that the cache can accommodate the new entry without requiring an eviction of existing data in cache memory. If, however, in decision block 225 it is determined that a cache eviction must occur to accommodate the new entry, the cache eviction process of the present invention not only can perform a cache eviction according to conventional cache replacement methodologies, but also the cache eviction process can select certain groups of data to be considered by the conventional cache replacement methodologies according to the propagated QoS terms.

Specifically, in one aspect of the present invention, cache eviction can be performed according to a weighted average of requests for data associated with a particular QoS metric when compared to all data requests received over a fixed period, whether the period is computed temporally or by numeric limitation. Thus, the weighted average can be computed according to the following equation:

$$\frac{(QoS \text{ metric}) * (\text{number of requests for data associated with the } QoS \text{ metric})}{(\text{total number of requests over period})}$$

To select particular data in the cache for eviction, in block 230 the most "overweighted" group of data associated with a particular QoS metric can be identified. Specifically, the QoS metric having the most data stored in the cache in excess of the optimal preferred proportion of data for that QoS metric can be considered the most overweighted. Once identified, in decision block 250 it can be determined whether to perform a cache eviction. If so, in block 235 a data element associated with that QoS metric can be evicted from the cache according to the selected conventional cache eviction methodology. Where no overweighted groups of data can be identified, data associated with the same QoS metric as the new entry can be subject to eviction.

Significantly, it is to be understood that the cache eviction policy of the present invention need not be applied rigidly. Rather, in a preferred aspect of the invention, hysterisis can be incorporated into the cache eviction logic. In particular, certain tolerances for overweighting can be considered in order to avoid unnecessary cache evictions. In this way, it will be permissible for the caching component of the storage system to remain somewhat out-of-balance in order to avoid disk thrashing.

In consequence of the cache replacement logic of the present invention, storage system components and, indeed, entire storage systems, can provide the advantages of differentiated service which, heretofore, had not been applied at the storage system level. Thus, QoS terms which can be enforced at the higher, network level, now too can be enforced at the lowest levels of the enterprise. The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A storage system comprising:
   re-writable media;
   a storage system controller;
   a cache; and,
   a Quality of Service (QoS) enforcement processor configured to selectively evict entries in said cache according to QoS terms propagated into the storage system through said storage system controller, said QoS terms specifying a guaranteed level of responsiveness minimally owed to particular requestors of content.

2. In a storage system, a cache eviction method comprising the steps of:
   categorizing entries in a cache according to common Quality of Service (QoS) metrics, said QoS metrics specifying a guaranteed level of responsiveness minimally owed to particular requestors of content;
   identifying categorizations whose entries consume an excessive portion of said cache; and,
   evicting an entry from among one of said identified categorizations.

3. The method of claim 2, wherein said identifying step comprises the steps of:
   computing a weighted average of entries in said cache for each of said categorized entries; and,
   identifying categorizations which have a weighted average which exceed a corresponding preferred allocation.

4. The method of claim 3, wherein said computing step comprises the steps of:
   for each category from among j total categories, computing an average according to the equation (Requests)(QoS Metric$_j$)/Requests(Total); and,
   weighting each computed average by QoS Metric$_j$.

5. The method of claim 3, wherein said identifying step comprises the steps of:
   establishing a threshold hysterisis value; and,
   identifying only those categorizations which have a weighted average which exceeds said corresponding preferred allocation by at least said threshold hysterisis value.

6. The method of claim 3, wherein said evicting step comprises the step of evicting an entry from among one of said identified categorizations whose weighted average most exceeds said corresponding preferred allocation.

7. The method of claim 3, wherein said evicting step further comprises evicting said entry according to a cache replacement methodology selected from the group consisting of least recently used, first-in first-out, last-in first out, and least frequently used.

8. A method for enforcing Quality of Service (QoS) terms in a storage system, the QoS terms specifying a guaranteed level of responsiveness minimally owed to particular requestors of content, said method comprising the steps of:
   (A) propagating a QoS metric into the storage system in conjunction with a request to retrieve data from the storage system;
   (B) locating said data in a caching component in the storage system;
   (C) if said data can be located, retrieving said data from said caching component; and, (D) if said data cannot be located:
  (1) retrieving said data from fixed storage in the storage system,
  (2) determining whether said caching component can accommodate a new cache entry,
  (3) if said caching component cannot accommodate a new cache entry:
    (a) selecting an existing cache entry from among a group of cache entries which share a common QoS metric, but which have consumed more cache then permitted according to said common QoS metric, and,
    (b) evicting said selected cache entry,
  (4) caching said data retrieved from fixed storage in said caching component along with said propagated QoS metric.

9. A machine readable storage having stored thereon a computer program for performing cache eviction in a storage system, said computer program comprising a routine set of instructions for causing the machine to perform the steps of:

categorizing entries in a cache according to common Quality of Service (QoS) metrics, said QoS metrics specifying a guaranteed level of responsiveness minimally owed to particular requestors of content;

identifying categorizations whose entries consume an excessive portion of said cache; and, evicting an entry from among one of said identified categorizations.

10. The machine readable storage of claim 9, wherein said identifying step comprises the steps of:

computing a weighted average of entries in said cache for each of said categorized entries; and, identifying categorizations which have a weighted average which exceed a corresponding preferred allocation.

11. The machine readable storage of claim 10, wherein said computing step comprises the steps of:

for each category from among j total categories, computing an average according to the equation (Requests) (QoS Metric$_j$)/Requests(Total); and, weighting each computed average by QoS Metric$_j$.

12. The machine readable storage of claim 10, wherein said identifying step comprises the steps of:

establishing a threshold hysterisis value; and, identifying only those categorizations which have a weighted average which exceeds said corresponding preferred allocation by at least said threshold hysterisis value.

13. The machine readable storage of claim 10, wherein said evicting step comprises the step of evicting an entry from among one of said identified categorizations whose weighted average most exceeds said corresponding preferred allocation.

14. The machine readable storage of claim 10, wherein said evicting step further comprises evicting said entry according to a cache replacement methodology selected from the group consisting of least recently used, first-in first-out, last-in first out, and least frequently used.

15. A machine readable storage having stored thereon a computer program for enforcing Quality of Service (QoS) terms in a storage system, the QoS terms specifying a guaranteed level of responsiveness minimally owed to particular requestors of content, said computer program comprising a routine set of instructions for causing the machine to perform the steps of:

(A) propagating a QoS metric into the storage system in conjunction with a request to retrieve data from the storage system;

(B) locating said data in a caching component in the storage system;

(C) if said data can be located, retrieving said data from said caching component; and, (D) if said data cannot be located:
  (1) retrieving said data from fixed storage in the storage system,
  (2) determining whether said caching component can accommodate a new cache entry,
  (3) if said caching component cannot accommodate a new cache entry:
    (a) selecting an existing cache entry from among a group of cache entries which share a common QoS metric, but which have consumed more cache then permitted according to said common QoS metric, and,
    (b) evicting said selected cache entry,
  (4) caching said data retrieved from fixed storage in said caching component along with said propagated QoS metric.

* * * * *